United States Patent
Kashiwagi et al.

(10) Patent No.: US 11,899,093 B2
(45) Date of Patent: Feb. 13, 2024

(54) RADAR DEVICE, VEHICLE, AND OBJECT POSITION DETECTION METHOD

(71) Applicant: Murata Manufacturing Co., Ltd., Kyoto (JP)

(72) Inventors: Katsuhisa Kashiwagi, Kyoto (JP); Nobuyuki Nozawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 460 days.

(21) Appl. No.: 17/325,716

(22) Filed: May 20, 2021

(65) Prior Publication Data

US 2021/0270954 A1    Sep. 2, 2021

Related U.S. Application Data

(63) Continuation of application No. PCT/JP2019/043661, filed on Nov. 7, 2019.

(30) Foreign Application Priority Data

Nov. 22, 2018 (JP) .................. 2018-219598

(51) Int. Cl.
*G01S 13/536* (2006.01)
*G01S 13/86* (2006.01)
*G01S 13/931* (2020.01)

(52) U.S. Cl.
CPC ............ *G01S 13/536* (2013.01); *G01S 13/86* (2013.01); *G01S 13/931* (2013.01); *G01S 2013/93274* (2020.01)

(58) Field of Classification Search
CPC ...... G01S 13/343; G01S 13/42; G01S 13/536; G01S 13/584; G01S 13/86; G01S 13/931; G01S 2013/93274
See application file for complete search history.

(56) References Cited

U.S. PATENT DOCUMENTS

| 2019/0033442 | A1* | 1/2019 | Millar ................... G01S 13/931 |
| 2020/0217952 | A1* | 7/2020 | Rider ................... G06F 18/251 |
| 2021/0373146 | A1* | 12/2021 | Buddendick ......... G01S 13/589 |

FOREIGN PATENT DOCUMENTS

| JP | H09-033642 A | 2/1997 |
| JP | 2006-343309 A | 12/2006 |

(Continued)

OTHER PUBLICATIONS

International Search Report for International Patent Application No. PCT/JP2019/043661 dated Feb. 10, 2020.

(Continued)

*Primary Examiner* — Timothy X Pham
(74) *Attorney, Agent, or Firm* — Pearne & Gordon LLP

(57) ABSTRACT

A radar device includes a radar unit, a signal processing unit, a GPS receiver, and a storage unit. The signal processing unit acquires, for each target, a distance (R) to the target and a relative velocity (Veff) between the radar unit and the target when the radar unit is moving. The signal processing unit separately detects positions of a plurality of targets by using a separation algorithm in which a difference between the relative velocities (Veff) is used. When the radar unit is stopped, the signal processing unit corrects the position of each target detected when the radar unit has been moving, based on a current position of the radar unit stored in the storage unit, and identifies the positions of the plurality of targets.

14 Claims, 12 Drawing Sheets

(56) References Cited

FOREIGN PATENT DOCUMENTS

| JP | 2006-349602 A | 12/2006 |
|----|---------------|---------|
| WO | 2018/002233 A1 | 1/2018 |

OTHER PUBLICATIONS

Written Opinion for International Patent Application No. PCT/JP2019/043661 dated Feb. 10, 2020.
Kobayashi et al., "Study on Simple Imaging by Squint-mode SAR with Millimeter Wave Automotive Radar" The Institute of Electronics, Information and Communication Engineers, Aug. 2017, vol. 117, No. 182, pp. 71-76, IEICE Technical Report.
Wang et al., "Velocity Compensation based Range-Doppler Decoupling Method for FMCW Ladar", Spring Congress on Engineering and Technology, 2012, IEEE.

\* cited by examiner

RADAR DEVICE, VEHICLE, AND OBJECT POSITION DETECTION METHOD

CROSS REFERENCE TO RELATED APPLICATIONS

This is a continuation of International Application No. PCT/JP2019/043661 filed on Nov. 7, 2019 which claims priority from Japanese Patent Application No. 2018-219598 filed on Nov. 22, 2018. The contents of these applications are incorporated herein by reference in their entireties.

BACKGROUND

Technical Field

The present disclosure relates to a radar device, a vehicle, and an object position detection method that are configured to identify a position of an object.

Patent Document 1 discloses an obstacle detection device capable of controlling the directivity of a transmission beam at two stages of a narrow angle and a wide angle, and capable of performing detection in a wide range. The obstacle detection device calculates an angle of an obstacle by a phase difference between reception elements.

Patent Document 1: Japanese Unexamined Patent Application Publication No. 2006-343309

BRIEF SUMMARY

In general, there are a large number of stationary objects, such as street lights, utility poles, guardrails, and fences around a vehicle. In the detection method described in Patent Document 1, not only a reflected wave from a target object but also a large number of unnecessary waves (clutter) from the stationary objects are received. For this reason, there is a problem that it is difficult to detect a plurality of objects being stationary at the same distance, for example.

The present disclosure provides a radar device, a vehicle, and an object position detection method that are capable of separately detecting a plurality of objects being stationary.

An embodiment of the present disclosure is a radar device including a radar unit configured to acquire data of a plurality of objects being stationary, a computing unit configured to calculate the acquired data, a current position acquisition unit configured to acquire a current position of the radar unit, and a current position storage unit configured to store the current position of the radar unit, in which when the radar unit is moving, the computing unit is configured to acquire, for each of the plurality of objects, a distance to the object, and a relative velocity between the radar unit and the object based on the data, and to separately detect positions of the plurality of objects by using a separation algorithm in which a difference between the relative velocities is utilized, and when the radar unit is stopped, the computing unit is configured to correct the positions of the plurality of objects detected when the radar unit has been moving, based on the current position of the radar unit stored in the current position storage unit, and to identify the positions of the plurality of objects.

According to one embodiment of the present disclosure, a plurality of stationary objects can be separately detected.

DETAILED DESCRIPTION

Hereinafter, a radar device according to embodiments of the present disclosure will be described in detail with reference to the accompanying drawings, with a case where the radar device is applied to a vehicle, such as an automobile given as an example.

Figure 1:
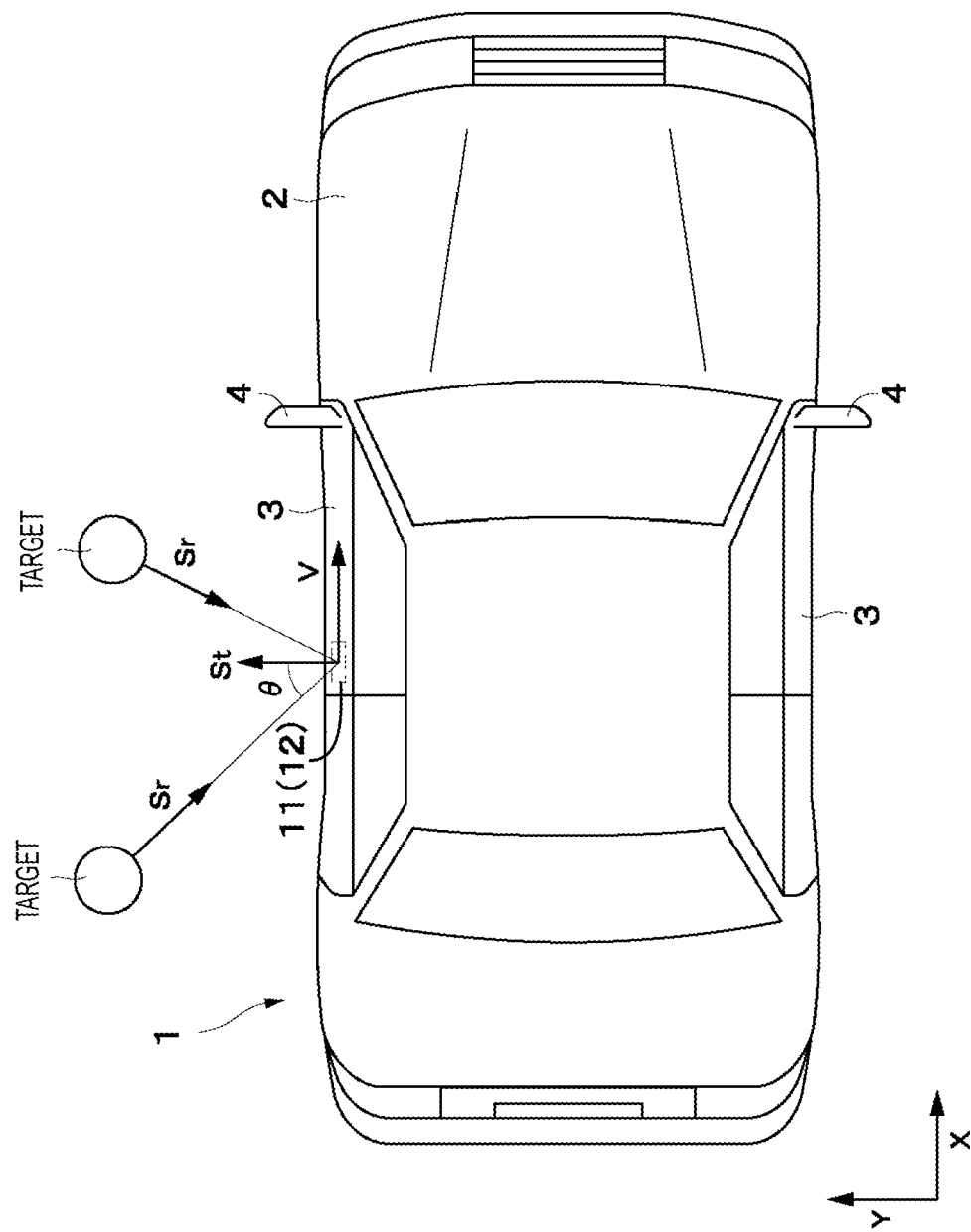
FIG. 1 is a plan view illustrating a vehicle according to a first embodiment of the present disclosure.

FIG. 1 illustrates a vehicle 1 according to a first embodiment of the present disclosure. The vehicle 1 includes a vehicle body 2, doors 3 attached to the vehicle body 2 so as to be opened and closed, and door mirrors 4 each of which is attached to the door 3. The door 3 can turn, for example, with its front side serving as a fulcrum. The door mirror 4 is attached to the front side of the door 3.

The vehicle 1 is provided with a radar device 11. The radar device 11 is a radar device that detects a target by, for example, an FMCW method. A radar unit 12 of the radar device 11 is installed in or on the door 3 of the vehicle 1 (see FIG. 1). The radar unit 12 is attached to a side face of the vehicle 1 that is orthogonal to a traveling direction of the vehicle 1. The radar device 11 is arranged such that a radiation direction of a transmission signal St is orthogonal to the traveling direction (an X direction) of the vehicle 1.

Note that FIG. 1 illustrates a state in which the radar device 11 is attached to the door 3 on the left side of the vehicle 1 with respect to the traveling direction (X direction) of the vehicle 1. The present disclosure is not limited to this, and the radar device 11 may be attached to the door 3 on the right side, or may be attached to a plurality of portions of the vehicle 1.

Figure 2:
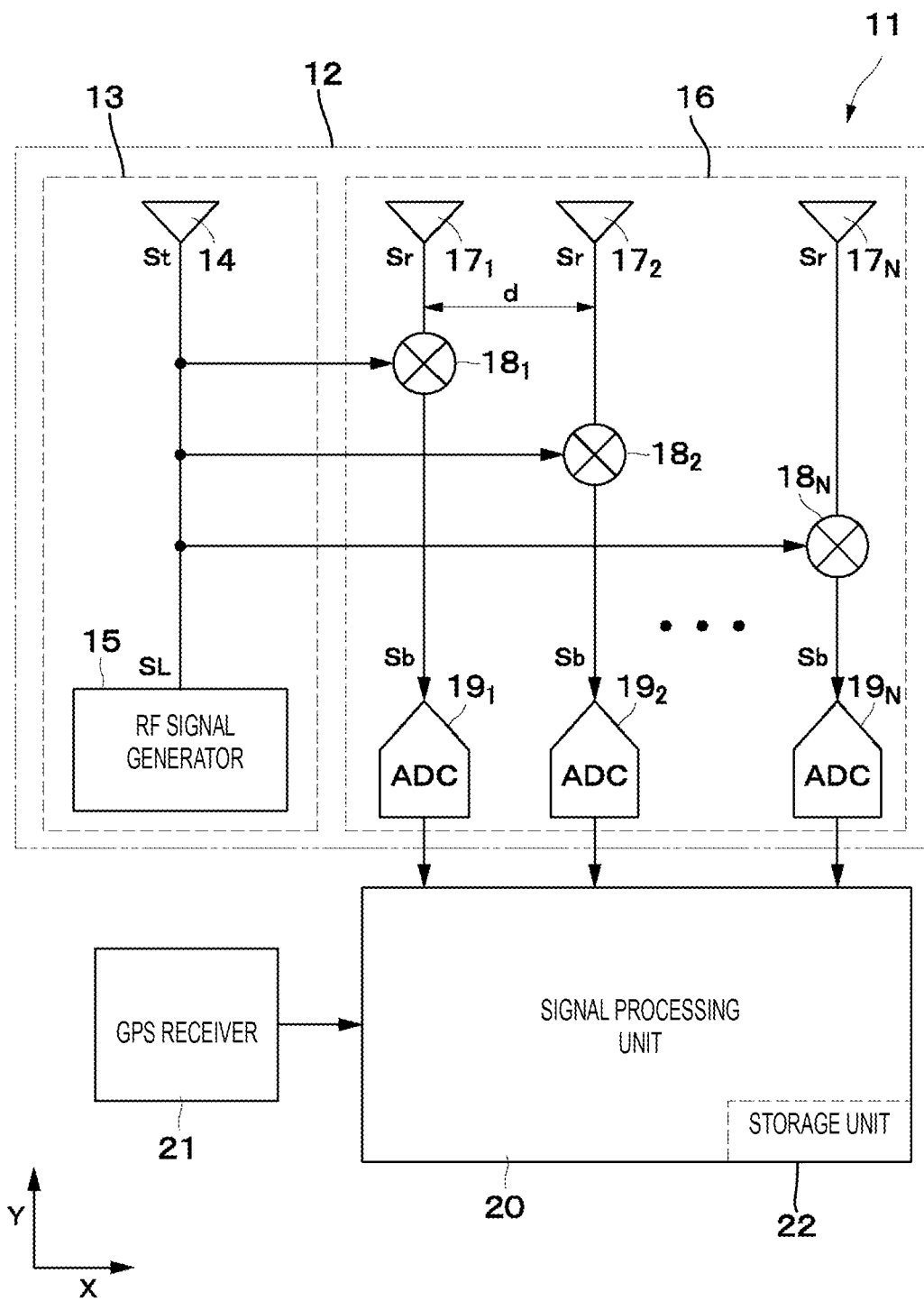
FIG. 2 is a block diagram illustrating a radar device in FIG. 1.

The radar device 11 includes the radar unit 12, a signal processing unit 20 (a processor) as a computing unit, a GPS receiver 21 as a current position acquisition unit, and a storage unit 22 (memory) as a current position storage unit (see FIG. 2). When the vehicle 1 travels, the radar device 11 moves at a moving velocity V in the X direction which is the traveling direction of the vehicle 1.

The radar unit 12 acquires data of a plurality of targets (objects) being stationary. Specifically, the radar unit 12 transmits a transmission signal St toward targets, and receives reflected waves of the transmission signal St by the targets as reception signals Sr (see FIG. 1). The radar unit 12 generates beat signals Sb each of which is a differential signal between the transmission signal St and the reception signal Sr. The radar unit 12 converts the beat signals Sb from analog signals to digital signals, and acquires the digital signals as data of the targets.

The radar unit 12 includes a transmission system 13 and a reception system 16. The transmission system 13 includes a transmission antenna 14 and an RF signal generator 15. The transmission system 13 transmits the frequency-modulated transmission signal St. The transmission antenna 14 radiates a local signal SL output from the RF signal generator 15 as the transmission signal St into the air. The transmission antenna 14 radiates the transmission signal St in the Y direction orthogonal to the traveling direction (X direction) of the vehicle 1. The transmission antenna 14 is configured of, for example, an omnidirectional antenna. With this, the transmission antenna 14 can transmit the transmission signal St in a wide range around the vehicle 1.

The RF signal generator 15 oscillates the local signal SL. Specifically, the RF signal generator 15 outputs the local signal SL formed of a chirp signal whose frequency linearly increases over time. The RF signal generator 15 outputs the generated local signal SL to the transmission antenna 14 and mixers $18_1$ to $18_N$. Note that a power amplifier may be connected between the RF signal generator 15 and the transmission antenna 14.

The reception system 16 receives reflected waves of the transmission signal St reflected from targets (objects) as the reception signals Sr, and generates the beat signals Sb each of which is a differential signal between the transmission signal St and the reception signal Sr. The reception system 16 includes reception antennas $17_1$ to $17_N$, the mixers $18_1$ to $18_N$, and ADCs $19_1$ to $19_N$. The reception system 16 may further include low-noise amplifiers, filters, and the like. The N (N is a natural number) reception antennas $17_1$ to $17_N$ are arranged at regular intervals with a predetermined interval dimension d, and are linearly aligned along the X direction. Thus, the reception antennas $17_1$ to $17_N$ configure an array antenna. When the targets reflect the transmission signal St, the reception antennas $17_1$ to $17_N$ receive reception signals Sr formed of reflected waves (echo signals) reflected and returned from the targets.

The mixers $18_1$ to $18_N$ output beat signals Sb from the reception signals Sr which are formed when the transmission signal St is reflected from the targets and which are received by the reception antennas $17_1$ to $17_N$ and the transmission signal St (the local signal SL). More specifically, the mixers $18_1$ to $18_N$ multiply the reception signals Sr received by the reception antennas $17_1$ to $17_N$ by the same local signal SL as the transmission signal St output by the RF signal generator 15 to generate the beat signals Sb. The mixers $18_1$ to $18_N$ are connected to the signal processing unit 20 with the ADCs $19_1$ to $19_N$ interposed therebetween. The ADCs $19_1$ to $19_N$ convert the beat signals Sb from analog signals to digital signals.

The signal processing unit 20 calculates data of the beat signals Sb acquired from the radar unit 12. That is, the signal processing unit 20 performs signal processing on the beat signals Sb. The data of the beat signals Sb converted into digital signals by the ADCs $19_1$ to $19_N$ is input to the signal processing unit 20. The signal processing unit 20 includes, for example, a fast Fourier transform (FFT), a microcomputer, and the like. The signal processing unit 20 acquires, for each target, a distance R from the radar unit 12 to the target, and a relative velocity Veff between the radar unit 12 and the target, based on the data of the beat signals Sb, when the radar unit 12 is moving. The signal processing unit 20 separately detects positions of a plurality of targets by using a separation algorithm in which a difference between the relative velocities Veff is used. Specifically, the signal processing unit 20 separates each target by using the difference between the relative velocities Veff, and acquires a target direction (azimuth angle θ) with respect to the radar unit 12 for each of the separated targets. Accordingly, the signal processing unit acquires the distance R and the azimuth angle θ for each target, and separately detects the positions of the plurality of targets.

The signal processing unit 20 is connected to the GPS receiver 21. The GPS receiver 21 acquires a current position of the radar unit 12 based on a signal of position information received by a GPS antenna (not illustrated). The GPS receiver 21 outputs information about the current position of the radar unit 12 to the signal processing unit 20.

Note that the current position of the radar unit 12 is not limited to be acquired by the GPS receiver 21, and may be acquired by an inertial sensor, such as an acceleration sensor, for example. In this case, since the inertial sensor detects a change in position, it is suitable to store the previous position information in the storage unit 22, for example.

In addition, the GPS receiver 21 does not need to measure the current position of the radar unit 12, and for example, may measure a current position of the vehicle body 2 to which the radar unit 12 is attached. In this case, for example, a storage device, such as a non-volatile memory stores an attachment position of the radar unit 12 with respect to the vehicle body 2. The storage device is connected to the signal processing unit 20. Thus, the signal processing unit 20 acquires the current position of the radar unit 12 based on the current position of the vehicle body 2 and the attachment position of the radar unit 12.

In addition, the signal processing unit 20 includes the storage unit 22 being readable and writable. The storage unit 22 stores a program of position estimation processing illustrated in FIG. 3. The signal processing unit 20 executes the program of the position estimation processing stored in the storage unit 22. The storage unit 22 stores a current position of the radar unit 12 when the radar unit 12 is moving. In addition, the storage unit 22 stores the positions of the targets when the radar unit 12 is moving.

When the radar unit 12 is stopped, the signal processing unit 20 corrects the positions of the targets detected when the radar unit 12 has been moving based on the current position of the radar unit 12 stored in the storage unit 22, and identifies the positions of the plurality of targets.

Figure 4:
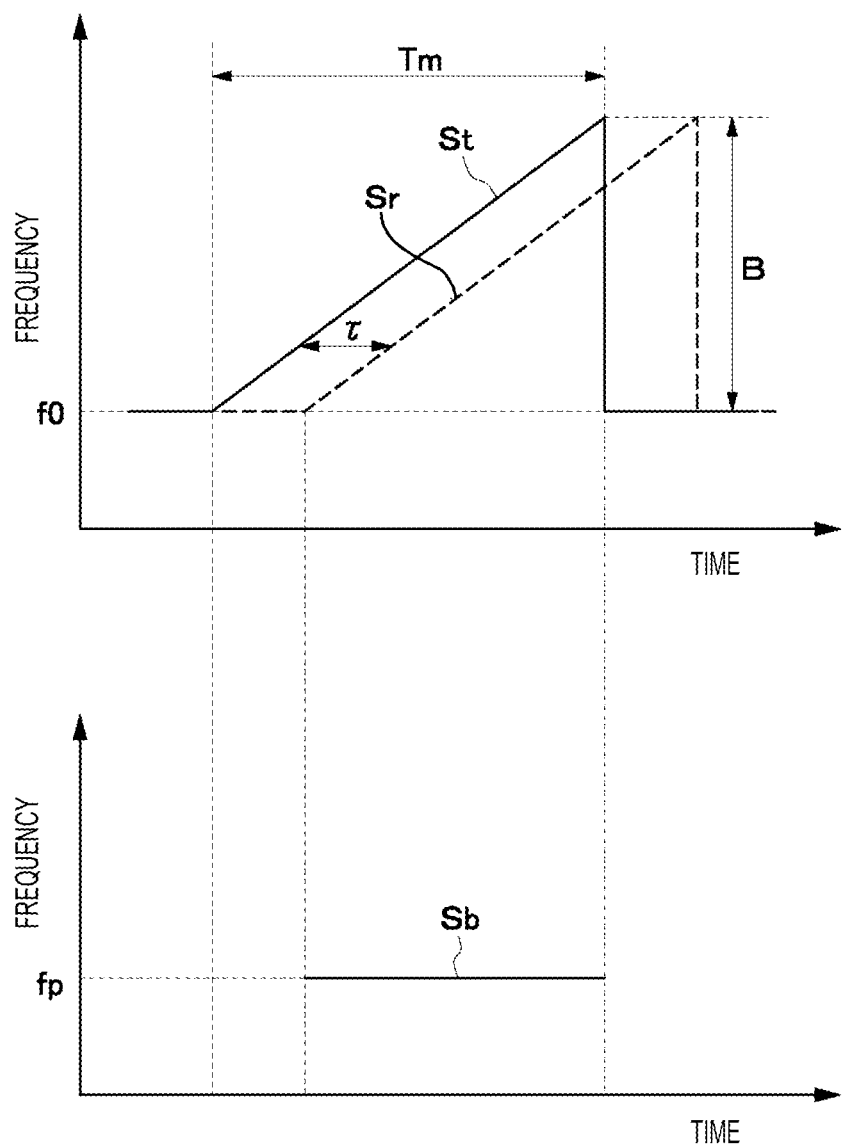
FIG. 4 is a characteristic diagram illustrating temporal changes in a transmission signal, a reception signal, and a beat signal that are formed of a single chirp signal.

Here, distance measurement of a target by the signal processing unit 20 will be described with reference to FIG. 4. As illustrated in FIG. 4, a frequency of the transmission signal St linearly increases from f0 to f0+B over time in a chirp period Tm (a period of a chirp signal). The reception signal Sr is delayed by a round-trip time τ until the transmission signal St is reflected by the target and returned. A frequency (peak frequency fp) of the beat signal Sb is proportional to the round-trip time τ until the transmission signal St is reflected by the target and returned. At this time, the peak frequency fp corresponding to the round-trip time τ appears in frequency components of the beat signal Sb. Thus, the signal processing unit 20 detects the peak frequency fp of the beat signal Sb, thereby detecting the distance R to the target by using Equation 1. Note that, in Equation 1, c represents the speed of light, and B represents a chirp bandwidth that is used.

$$R = \frac{cTm}{2B} fp \qquad \text{[Equation 1]}$$

Figure 5:
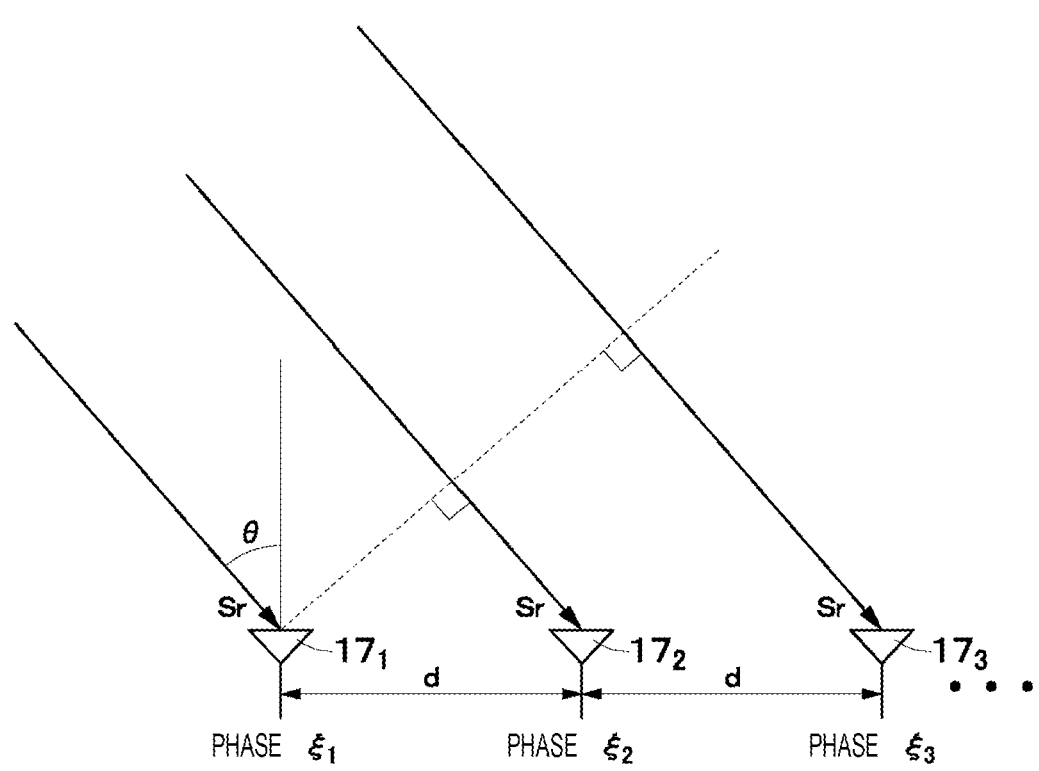
FIG. 5 is an explanatory diagram illustrating a state in which a plurality of reception antennas receives reception signals from a target.

Next, azimuth measurement of a target by the signal processing unit 20 will be described with reference to FIG. 5. FIG. 5 illustrates a case where the target is present in a direction of an azimuth angle θ with respect to a Y direction. In this case, the azimuth angle θ corresponds to an arrival direction of a reception signal Sr.

The radar device 11 transmits a transmission signal St formed of a chirp signal. The transmission signal St is reflected by the target and received by the plurality of reception antennas $17_1$ to $17_N$ as reception signals Sr, and beat signals Sb are generated. At this time, a reception signal Sr received by any reception antenna 17i has a phase $\xi_i$ represented by Equation 2. Note that, in Equation 2, λ represents a wave length of the transmission signal St in free space, and d represents an interval dimension between two adjacent reception antennas $17_i$ and $17_{i+1}$. Thus, the signal processing unit 20 can detect the azimuth angle θ of the target from Equation 3 by detecting the phases $\xi_i$, $\xi_{i+1}$ of the reception signals Sr received by the two adjacent reception antennas $17_i$, $17_{i+1}$, for example. Note that, for detection of the azimuth angle θ, it is optional to use the reception signals Sr of the two adjacent reception antennas $17_i$, $17_{i+1}$, and the reception signals Sr of the two reception antennas $17_1$, $17_N$ positioned at both ends in the X direction may be used, for example.

$$\xi_i = \frac{2\pi d(i-1)}{\lambda} \sin\theta \qquad \text{[Equation 2]}$$

$$\theta = \sin^{-1}\left[\frac{\lambda}{2\pi d}(\xi_{i+1} - \xi_i)\right] \qquad \text{[Equation 3]}$$

Next, relative velocity measurement between a target and the radar unit 12 by the signal processing unit 20 will be described with reference to FIG. 6.

Figure 6:
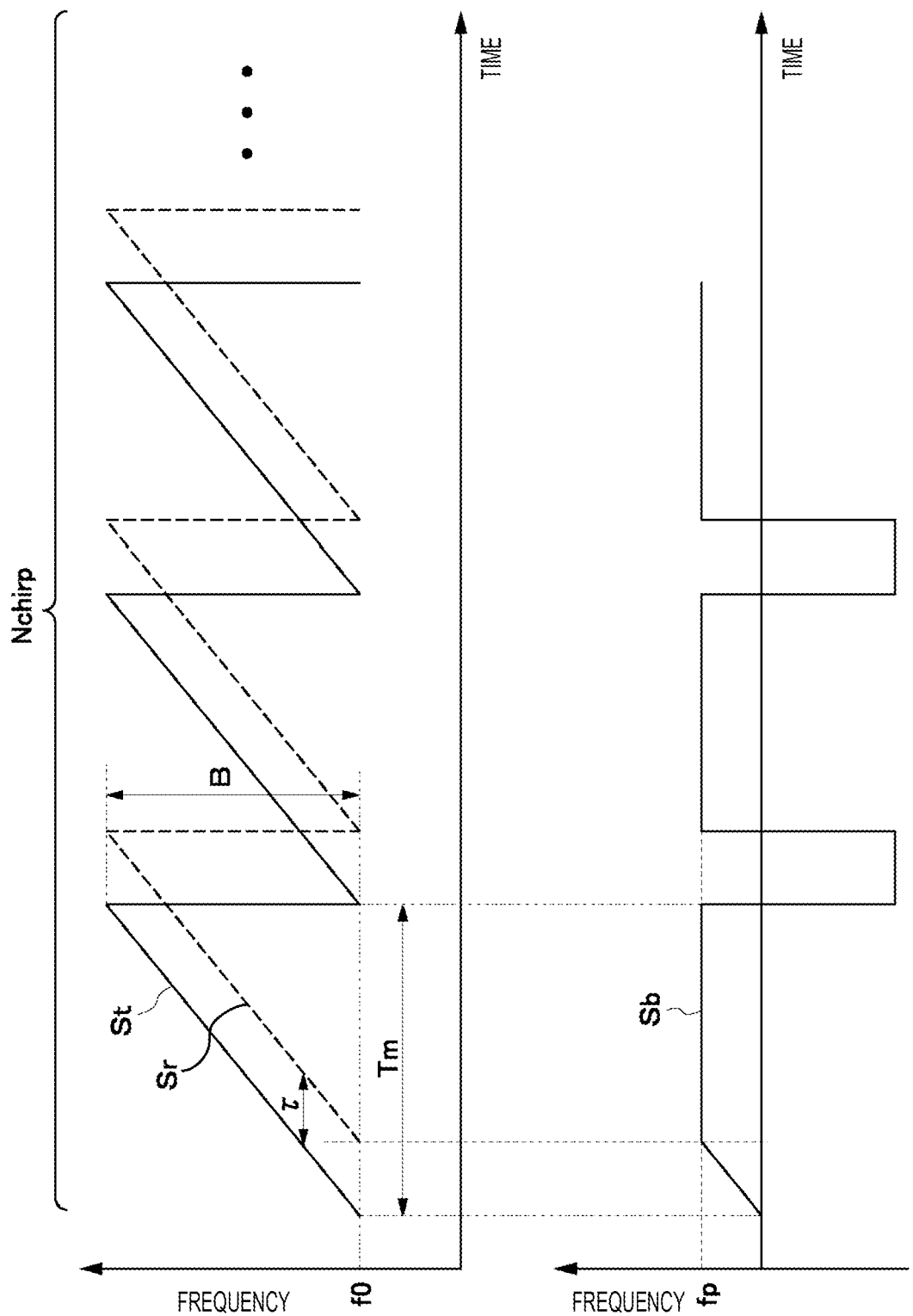
FIG. 6 is a characteristic diagram illustrating temporal changes in a transmission signal, a reception signal, and a beat signal that are formed of a plurality of consecutive chirp signals.

As illustrated in FIG. 6, the radar device 11 transmits a transmission signal St formed of Nchirp number of consecutive chirp signals (Nchirp is a natural number equal to or larger than two) from the transmission antenna 14. The transmission signal St is reflected by the target, and received by the reception antennas $17_1$ to $17_N$ as reception signals Sr, and beat signals Sb are generated. At this time, a phase difference Δξ is generated between the beat signal Sb due to the first chirp signal and the beat signal Sb due to the Nchirp-th chirp signal according to a relative velocity Veff between the target and the radar device 11. Thus, the signal processing unit 20 detects the phase difference Δξ generated by Nchirp number of the chirp signals, thereby detecting the relative velocity Veff from Equation 4.

$$Veff = \frac{\lambda \Delta \xi}{4\pi TmNchirp} \qquad \text{[Equation 4]}$$

Figure 7:
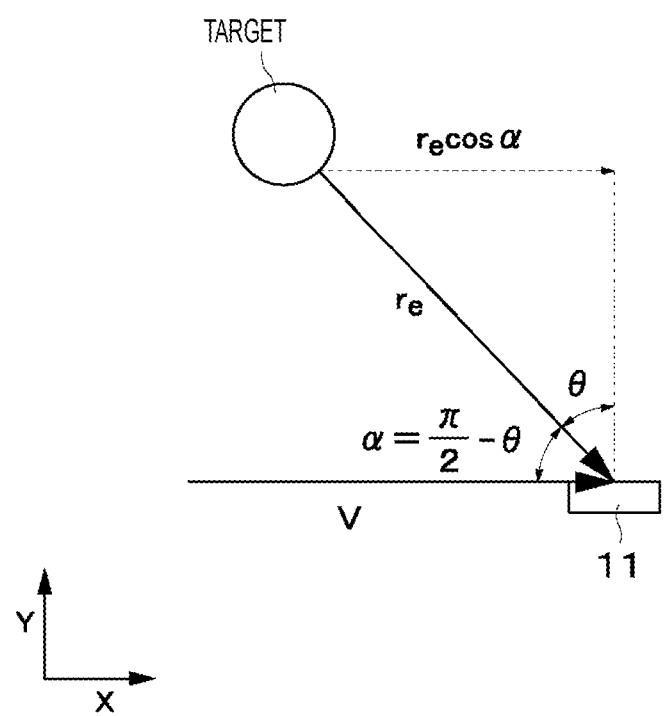
FIG. 7 is an explanatory diagram illustrating a positional relationship between the radar device and a target.

Further, as illustrated in FIG. 7, when a reflection direction of the reflected wave from the target toward the radar device 11 is defined as a vector r, in a case where the vehicle 1 moves in the X direction at a moving velocity V, the relative velocity Veff is represented by an inner product of a unit vector r e of the vector r and a vector of the moving velocity V, as indicated by Equation 5. Thus, the relative velocity Veff is defined by the moving velocity V and an angle α between the traveling direction of the vehicle 1 and the target, and has a value different depending on the position of the target.

$$Veff = r \cdot V \qquad \text{[Equation 5]}$$
$$= |r_e||V|\cos\alpha$$

Next, description will be given of target position estimation processing by the signal processing unit 20 with reference to FIG. 3. For example, when a braking operation is performed and the vehicle 1 is changing from a moving state to a stopped state, the signal processing unit 20 executes the program of the position estimation processing illustrated in FIG. 3.

Figure 3:
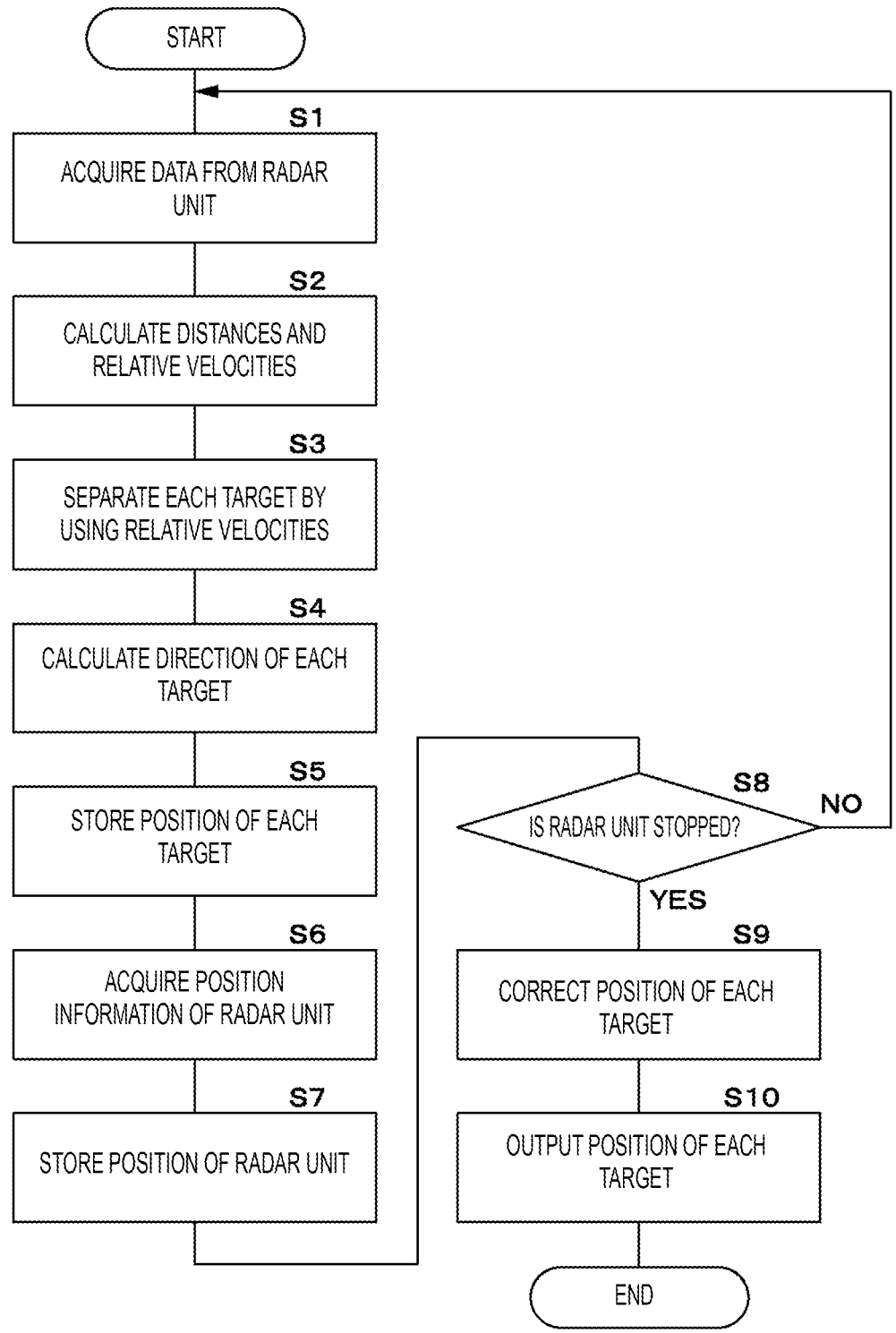
FIG. 3 is a flowchart illustrating target position estimation processing to be executed by a signal processing unit.

In step S1 in FIG. 3, the signal processing unit 20 acquires data of the beat signals Sb from the radar unit 12. In step S2, the signal processing unit 20 calculates a distance R from the radar unit 12 to each target based on the acquired data of the beat signals Sb and Equation 1. Further, the signal processing unit 20 calculates a relative velocity Veff between the radar unit 12 and each target based on the acquired data of the beat signals Sb and Equation 4.

Figure 8:
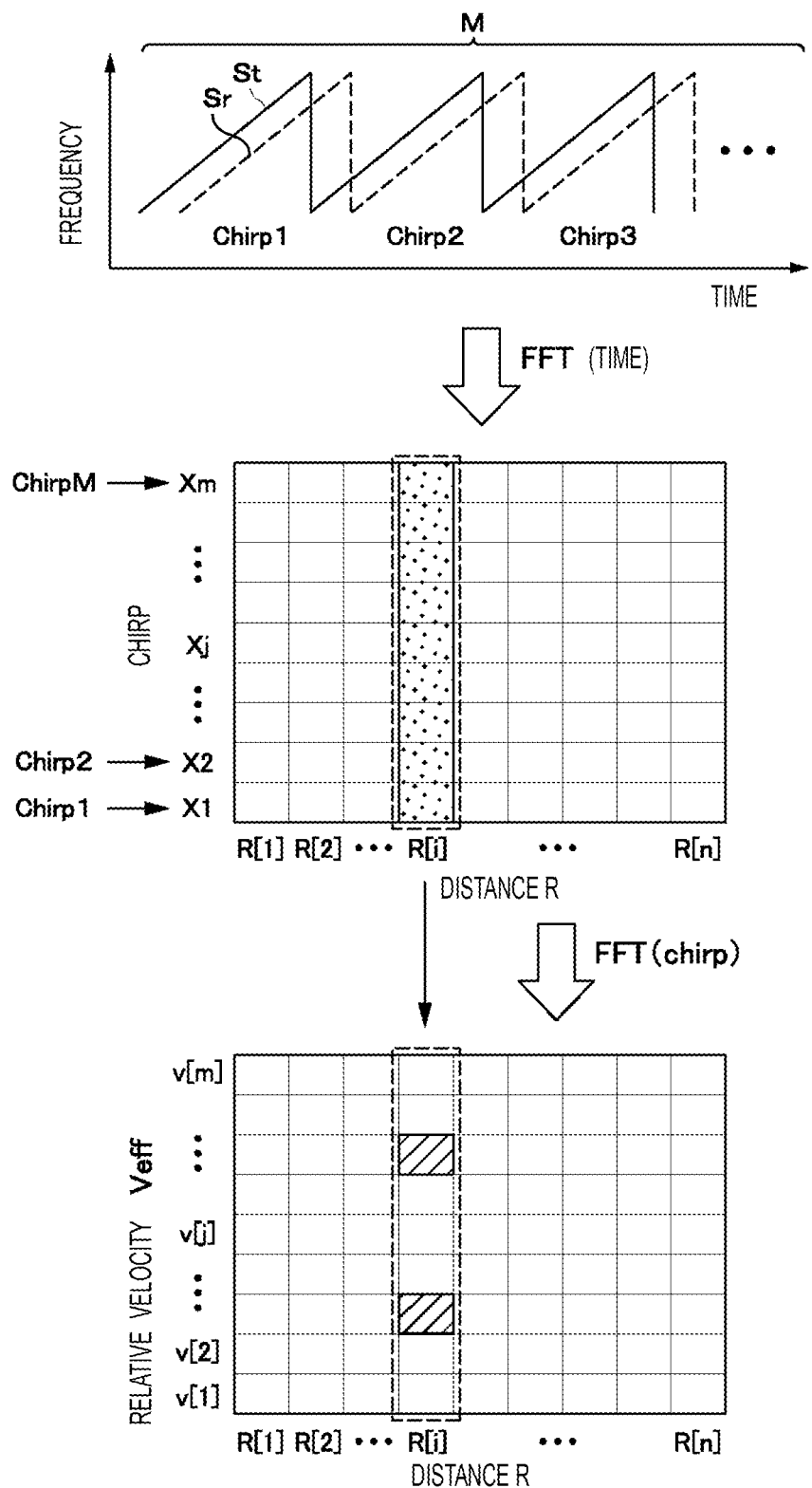
FIG. 8 is an explanatory diagram illustrating an algorithm for determining a relationship between a distance and a relative velocity.

In step S3, the signal processing unit 20 separates each target based on a difference between the relative velocities Veff. At this time, the signal processing unit 20 separates the data of the beat signals Sb for each of the different relative velocities Veff. At this time, for separating each target by using the relative velocities Veff based on Equation 4 and Equation 5, the signal processing unit 20 uses, for example, an FFT. An example of a method of separating each target will be described with reference to FIG. 8. For example, the radar unit 12 transmits M number of chirp signals (a transmission signal St) (M is a natural number equal to or larger than two), and receives reflected waves (reception signals Sr) at that time. The signal processing unit 20 acquires the beat signals Sb based on the transmission signal St and the reception signals Sr. The beat signals Sb change over time. Due to this, the signal processing unit 20 applies an FFT, in terms of time, to the beat signal Sb for each chirp signal. At this time, since a frequency of the beat signal Sb corresponds to a distance, data of distance components for each chirp signal can be obtained. Values of the data of the distance components change for each chirp when the relative velocity Veff is present. Thus, the signal processing unit 20 applies an FFT, in terms of the chirps, to the data of the distance components for each chirp. Thereby, a relationship between the distance R and the relative velocity Veff can be obtained.

Figure 9:
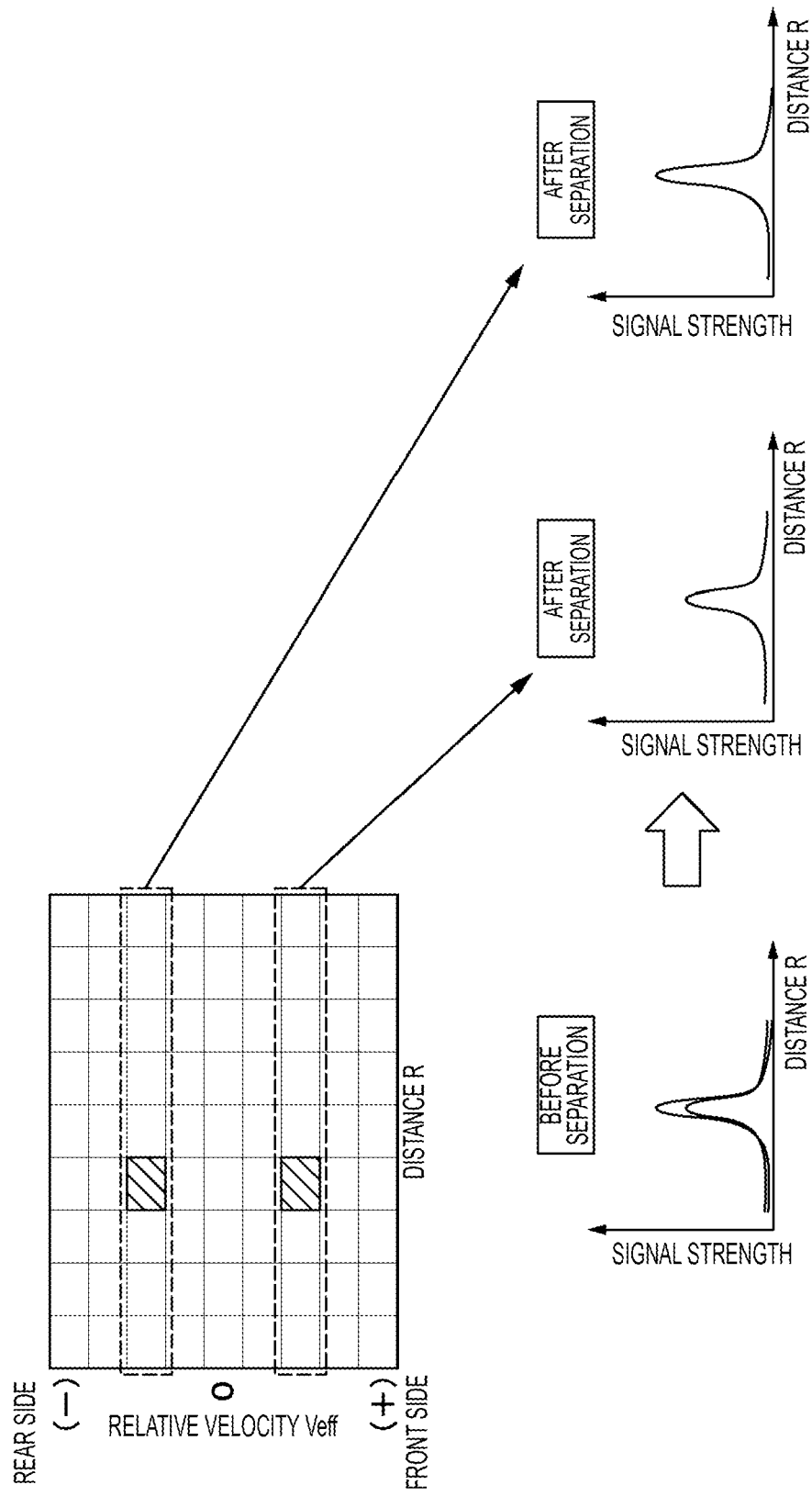
FIG. 9 is an explanatory diagram illustrating a separation algorithm for separately detecting positions of a plurality of objects by using a difference in relative velocity.

In this way, the signal processing unit 20 obtains a relationship between a distance R and a signal strength for each of the different relative velocities Veff (see FIG. 9). At this time, the target exists at a position at which the signal strength increases among the distance R. Thus, the signal processing unit 20 generates a map with the distance R as the horizontal axis and the relative velocity Veff as the vertical axis. The signal processing unit 20 arranges each target in the map.

When a plurality of targets exists around the radar unit 12, the relative velocity Veff has a different value for each target.

For this reason, for example, even in a case where the plurality of targets is arranged around the radar unit 12 in a separated manner at the same distance R, the relative velocity Veff has a different value for each target (see FIG. 9).

In step S4, the signal processing unit 20 calculates an azimuth angle θ as a target direction for each target separated in step S3. Specifically, the signal processing unit 20 calculates the azimuth angle θ based on the data of the beat signals Sb separated for each of the different relative velocities Veff and Equation 3. At this time, a position of each target is specified by the distance R and the azimuth angle θ of the target. Thus, the signal processing unit 20 can separately detect the positions of the plurality of targets according to differences between the relative velocities Veff. In step S5, the signal processing unit 20 stores the positions of the plurality of targets in the storage unit 22.

In step S6, the signal processing unit 20 acquires position information of the radar unit 12 from the GPS receiver 21. In step S7, the signal processing unit 20 stores a current position of the radar unit 12 in the storage unit 22.

In step S8, the signal processing unit 20 determines whether or not the radar unit 12 is stopped. Specifically, the signal processing unit 20 determines whether or not the radar unit 12 is stopped, for example, depending on whether or not the current position of the radar unit 12 has changed before and after one control period. Note that whether or not the current position of the radar unit 12 has changed may be determined in consideration of a measurement error of the GPS receiver 21.

In a case where the current position of the radar unit 12 has changed, the radar unit 12 is moving. For this reason, it is determined as "NO" in step S8, and the processing in step S1 and subsequent steps is repeated. On the other hand, in a case where the position of the radar unit 12 has not changed, the radar unit 12 is stopped. For this reason, it is determined as "YES" in step S8, and the processing proceeds to step S9.

Figure 10:
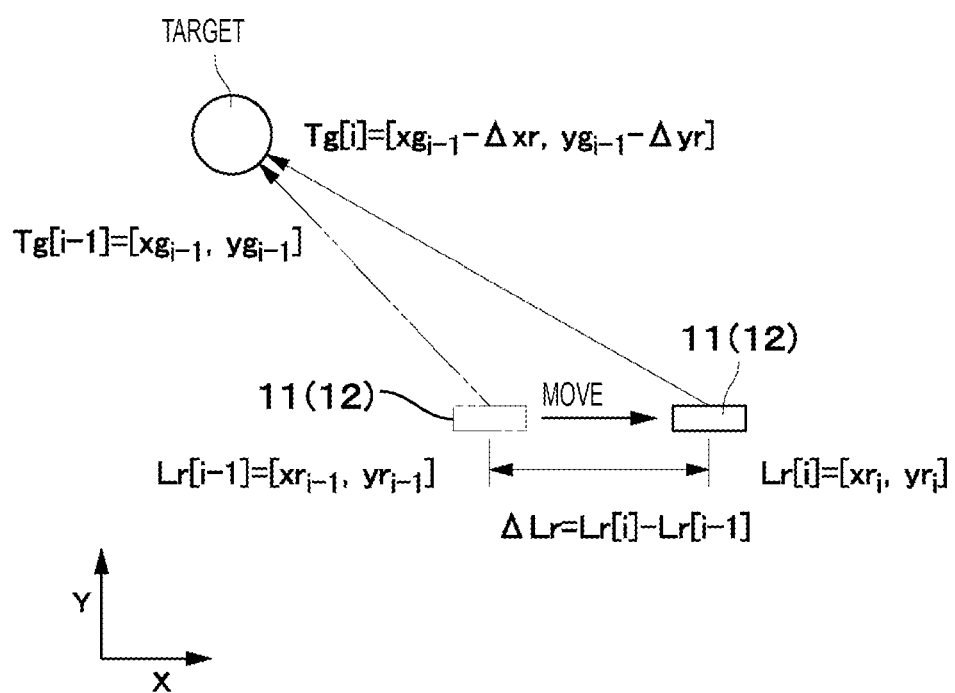
FIG. 10 is an explanatory diagram illustrating a position correction algorithm for correcting a position of a target detected before the radar unit is stopped and obtaining a position of the target after the radar unit is stopped.

In step S9, the signal processing unit 20 corrects the immediately preceding position of each target based on the current position of the radar unit 12 (see FIG. 10). For example, the current position of the radar unit 12 when the radar unit 12 is stopped is denoted as Lr[i], and the current position of the radar unit 12 when the radar unit 12 is moving immediately before the radar unit 12 is stopped is denoted as Lr[i−1]. Further, the position of the target when the radar unit 12 is moving immediately before the radar unit 12 is stopped is denoted as Tg[i−1]. At this time, the current position Lr[i−1] of the radar unit 12 and the position of the target Tg[i−1] immediately before the radar unit 12 is stopped are stored in the storage unit 22.

Thus, when the radar unit 12 is stopped, the signal processing unit 20 acquires a difference (displacement amount ΔLr) between the current position Lr[i−1] of the radar unit 12 that has been acquired immediately before the stop of the radar unit 12 and that has been stored in the storage unit 22 and the current position Lr[i] of the radar unit 12 when the radar unit 12 is stopped. Based on the displacement amount ΔLr of the radar unit 12, the signal processing unit 20 corrects the position of the target Tg[i−1] that has been acquired immediately before the stop of the radar unit 12 and that has been stored in the storage unit 22, and identifies the position of the target Tg[i] when the radar unit 12 is stopped.

More specifically, as indicated by Equation 6 and Equation 7, based on the displacement amount ΔLr of the radar unit 12, the immediately preceding position of the target Tg[i−1] is corrected, and the position of the target Tg[i] viewed from the radar unit 12 being in the stopped state is obtained.

Note that, in Equation 6, $xr_i$ represents a position of the radar unit 12 in the X direction when the radar unit 12 is stopped, and $yr_i$ represents a position of the radar unit 12 in the Y direction when the radar unit 12 is stopped. In Equation 6, $xr_{i-1}$ represents a position of the radar unit 12 in the X direction immediately before the radar unit 12 is stopped, and $yr_{i-1}$ represents a position of the radar unit 12 in the Y direction immediately before the radar unit 12 is stopped. In Equation 7, $xg_i$ represents the position of the target in the X direction when the radar unit 12 is stopped, and $yg_i$ represents the position of the target in the Y direction when the radar unit 12 is stopped. $xg_{i-1}$ represents the position of the target in the X direction immediately before the radar unit 12 is stopped, and $yg_{i-1}$ represents the position of the target in the Y direction immediately before the radar unit 12 is stopped. In Equation 7, Δxr represents a displacement amount in the X direction of the radar unit 12 from immediately before the stop of the radar unit 12 to the stop, and Δyr represents a displacement amount in the Y direction of the radar unit 12 from immediately before the stop of the radar unit 12 to the stop. In step S10, the signal processing unit 20 outputs the corrected position of the target Tg[i].

Additionally, FIG. 10 illustrates a case where the position of the target Tg[i−1] immediately before the radar unit 12 is stopped is corrected and the position of the target Tg[i] when the radar unit 12 is stopped is identified as an example. The present disclosure is not limited thereto, and for example, all positions of the target detected before the radar unit 12 is stopped may be corrected, and then, the position of the target when the radar unit 12 is stopped may be identified. In this case, it is possible to widen a target detection range, compared to the case where only the position of the target immediately before the radar unit 12 is stopped is used.

$$Lr[i] = [xr_i, yr_i] \qquad \text{[Equation 6]}$$
$$\Delta Lr = Lr[i] - Lr[i-1]$$
$$\Delta xr = xr_i - xr_{i-1}$$
$$\Delta yr = yr_i - yr_{i-1}$$
$$Tg[i-1] = [xg_{i-1}, yg_{i-1}] \qquad \text{[Equation 7]}$$
$$Tg[i] = Tg[i-1] - \Delta Lr = [xg_{i-1} - \Delta xr, yg_{i-1} - \Delta yr]$$

Thus, the radar device 11 according to the present embodiment includes the radar unit 12 that acquires data of a plurality of targets (objects) being stationary, the signal processing unit 20 that calculates the acquired data, the GPS receiver 21 that acquires a current position of the radar unit 12, and the storage unit 22 that stores the current position of the radar unit 12.

In addition, the signal processing unit 20 acquires, for each target, a distance to the target and a relative velocity Veff between the radar unit 12 and the target, based on the data, when the radar unit 12 is moving. The signal processing unit 20 separately detects positions of the plurality of targets by using a separation algorithm in which a difference between the relative velocities Veff is used. That is, the signal processing unit 20 separates data of the beat signals Sb for each relative velocity Veff, and calculates a target direction (azimuth angle θ) for each of the separated pieces of the data. Accordingly, the distance R and the azimuth angle θ are identified for each target, and thus, the signal processing unit 20 identifies the position of the target by using the distance R and the azimuth angle θ. When the radar unit 12 is stopped, the signal processing unit 20 corrects the positions of the targets detected when the radar unit 12 has been moving based on the current position of the radar unit 12 stored in the storage unit 22, and identifies the positions of the plurality of targets.

The radar unit 12 measures the surrounding objects while moving immediately before the vehicle 1 is stopped, such as several seconds before. At this time, a plurality of stationary objects (for example, a ground surface, a pole, a tree, and the like) may be disposed around the vehicle 1. However, even in the case where the plurality of targets exists around the radar unit 12, the relative velocity Veff has a different value for each target. That is, for example, even in a case where the plurality of targets is disposed around the radar unit 12 in a separated manner at the same distance R, the relative velocity Veff has a different value for each target. Thus, the radar device 11 can separately detect the plurality of targets according to the difference between these relative velocities Veff. As a result, even when a large number of stationary objects (for example, a ground surface, a pole, a tree, and the like) are disposed around the vehicle 1, clutter from these stationary objects can be separated.

However, when the radar unit 12 is stopped, the relative velocities Veff cannot be calculated, making it difficult to separately detect each target. Thus, when the radar unit 12 is stopped, the signal processing unit 20 corrects the position of each target detected when the radar unit 12 has been moving, based on the current position of the radar unit 12 stored in the storage unit 22.

At this time, the position of each target is identified by the distance R and the azimuth angle θ. That is, the position of each target indicates a target coordinate with the radar unit 12 being as a reference (for example, an origin). For this reason, when the radar unit 12 moves, the position of each target changes. Thus, the signal processing unit 20 obtains a displacement amount ΔLr which is a difference between the current position of the radar unit 12 when the radar unit 12 is stopped and the current position of the radar unit 12 that has been acquired immediately before the stop of the radar unit 12 and that has been stored in the storage unit 22. Then, the signal processing unit 20 corrects the position of each target detected immediately before the stop of the radar unit 12 based on the displacement amount ΔLr, and identifies the position of each target when the radar unit 12 is stopped. Accordingly, even when the vehicle 1 is stopped and the radar unit 12 is not moving, the position of each target can be detected based on the previously acquired position of the target.

Further, the radar device 11 repeats the target position measurement in a state in which the radar unit 12 is moving. For this reason, it is possible to widen a target detection range, compared with a case where the position of each target is measured in a state in which the radar unit 12 is stopped.

The radar unit 12 is attached to a side face of the vehicle 1 that is orthogonal to a traveling direction of the vehicle 1. Thus, it is possible to radiate the transmission signal St over a wide range from the front side to the rear side in the moving direction of the vehicle 1, and it is possible to detect each target in the range.

The radar unit 12 of the radar device 11 is installed in or on the door 3 of the vehicle 1. Because of this, not only the movement of the vehicle 1 but also an opening and closing operation of the door 3 cause the radar unit 12 to move, and a relative velocity between the radar unit 12 and each target is generated. Thus, the position of each target can be detected by using a difference between the relative velocities due to the opening and closing operation of the door 3.

Figure 11:
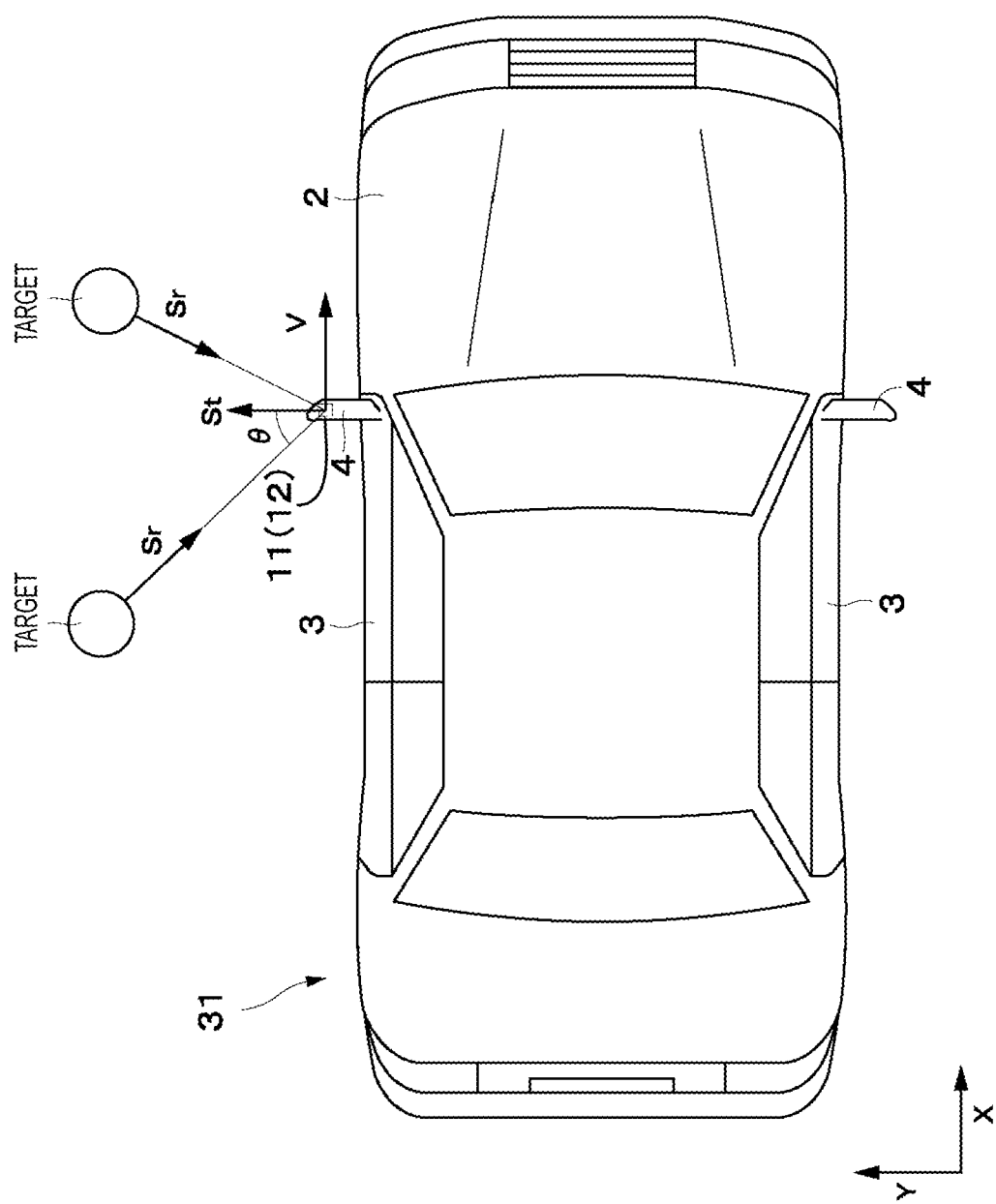
FIG. 11 is a plan view illustrating a vehicle according to a second embodiment of the present disclosure.
Figure 12:
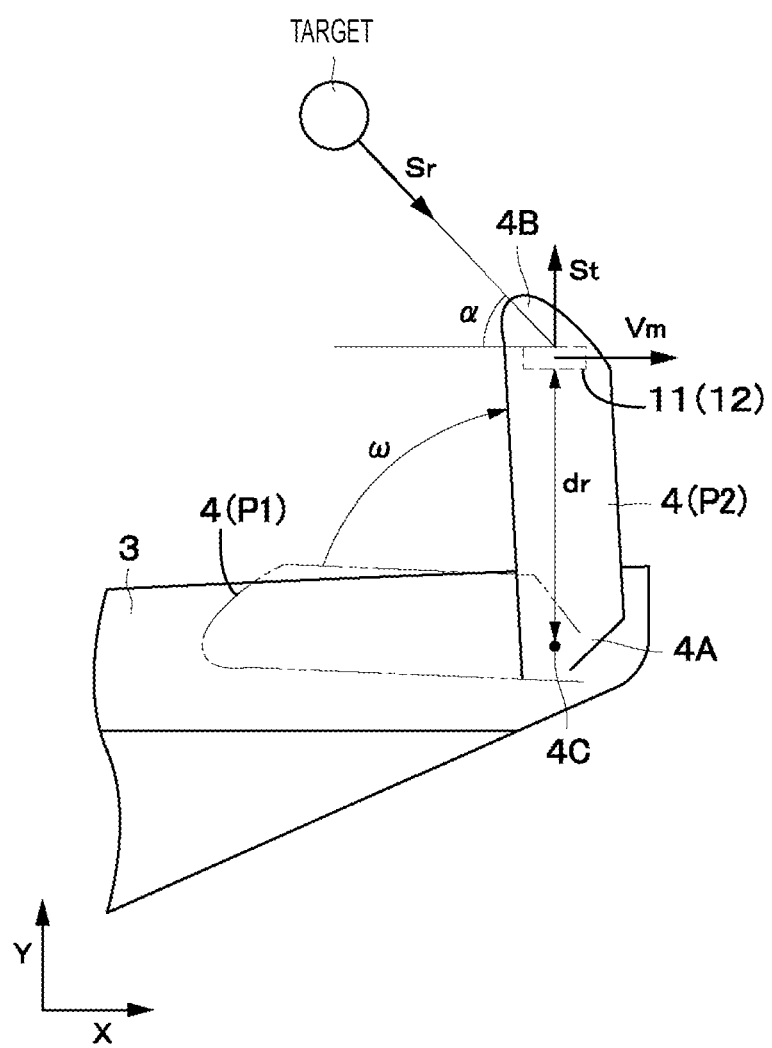
FIG. 12 is an enlarged plan view illustrating a door mirror and a radar device in FIG. 11.

Next, FIG. 11 and FIG. 12 illustrate a second embodiment of the present disclosure. Then, a feature of the second embodiment is that the radar unit of the radar device is installed in or on the door mirror of the vehicle. Note that, in the second embodiment, the same constituent elements as those in the first embodiment are denoted by the same reference signs, and description thereof will be omitted.

FIG. 11 illustrates a vehicle 31 according to the second embodiment of the present disclosure. The vehicle 31 is configured similarly to the vehicle 1 according to the first embodiment, and includes the vehicle body 2, the doors 3, and the door mirrors 4. A base end portion 4A of the door mirror 4 is attached to the front side of the door 3 (see FIG. 12). A top end portion 4B of the door mirror 4 is disposed at a position farther away from the door 3 than the base end portion 4A. The door mirror 4 can turn about a fulcrum 4C of the base end portion 4A. The door mirror 4 includes a motor (not illustrated), and is capable of being electrically housed. Thus, the door mirror 4 is capable of being automatically displaced between a housing position P1 extending along the door 3 and a use position P2 protruding from the door 3 to the outside.

The radar unit 12 of the radar device 11 is installed in or on the door mirror 4. More specifically, the radar unit 12 of the radar device 11 is attached to the top end portion 4B of the door mirror 4. At this time, the radar device 11 is arranged such that the radiation direction of the transmission signal St is orthogonal to an opening and closing direction (turning direction) of the door mirror 4.

When the door mirror 4 is turned and displaced, the radar device 11 is displaced at a moving velocity Vm. At this time, the moving velocity Vm of the radar device 11 is expressed by the following Equation 8 based on a distance dr from the fulcrum 4C of the door mirror 4 to the radar device 11 and an angular velocity ω of the door mirror 4. Accordingly, the relative velocity Veff generated between each target and the radar unit 12 is expressed by Equation 9.

$$Vm = dr \times \omega \qquad \text{[Equation 8]}$$

$$Veff = r_e \cdot Vm \qquad \text{[Equation 9]}$$

$$= |r_e||Vm|\cos\alpha$$

Thus, also in the second embodiment configured as described above, it is possible to separately detect a plurality of objects being stationary in a substantially similar manner to that in the first embodiment described above. In addition, in the second embodiment, since the radar device 11 is attached to the door mirror 4, the radar device 11 can be moved by, for example, displacing the door mirror 4 from the housing position P1 to the use position P2. Thus, in a state in which the vehicle 31 is stopped, the relative velocity Veff can be generated between each target being stationary and the radar device 11 (radar unit 12), and the position of the target can be detected.

Note that, in each of the above-described embodiments, as the transmission signal St, a chirp signal whose frequency linearly increases is used, but a chirp signal whose frequency linearly decreases may be used.

In each of the above-described embodiments, the relative velocity Veff is detected by using beat signals based on Nchirp number of chirp signals. The present disclosure is not limited thereto, and for example, a transmission signal whose frequency has an ascending portion and a descending portion may be radiated, and when the frequency rises and falls, a relative velocity may be detected based on a change in its beat frequency. Further, a relative velocity may be detected based on a temporal change in distance R.

In each of the above-described embodiments, a case has been exemplified in which the transmission antenna 14 is configured of a single antenna element. The present disclosure is not limited thereto, and the transmission antenna may be configured of an array antenna including a plurality of antenna elements.

In each of the embodiments described above, the radar device 11 that estimates a position of each target in a two-dimensional plane has been described as an example, but the present disclosure may be applied to a radar device that estimates a position of each target in a three-dimensional space. In this case, a plurality of reception antennas is arranged at intervals in the X direction and the Z direction. As a result, the radar device can obtain not only an azimuth angle θ but also an elevation/depression angle φ. In this case, the position correction illustrated in Equation 6 and Equation 7 is also extended in three dimensions including the Z direction. Thus, the signal processing unit corrects the position of the target Tg[i−1] immediately before the radar unit is stopped based on the following Equation 10 and Equation 11, and identifies the position of the target Tg[i] when the radar unit is stopped.

$$Lr[i] = [xr_i, yr_i, zr_i] \quad \text{[Equation 10]}$$

$$\Delta Lr = Lr[i] - Lr[i-1]$$

$$\Delta xr = xr_i - xr_{i-1}$$

$$\Delta yr = yr_i - yr_{i-1}$$

$$\Delta zr = zr_i - zr_{i-1}$$

$$Tg[i-1] = [xg_{i-1}, yg_{i-1}, zg_{i-1}] \quad \text{[Equation 11]}$$

$$Tg[i] =$$

$$Tg[i-1] - \Delta Lr = [xg_{i-1} - \Delta xr, yg_{i-1} - \Delta yr, zg_{i-1} - \Delta zr]$$

Next, the following aspects as the radar device, the vehicle, and the object position detection method included in the above-described embodiments, for example, may be considered.

A first aspect is a radar device including a radar unit configured to acquire data of a plurality of objects being stationary, a computing unit configured to calculate the acquired data, a current position acquisition unit configured to acquire a current position of the radar unit, and a current position storage unit configured to store the current position of the radar unit, wherein when the radar unit is moving, the computing unit is configured to acquire, for each of the plurality of objects, a distance to the object, and a relative velocity between the radar unit and the object based on the data, and to separately detect positions of the plurality of objects by using a separation algorithm in which a difference between the relative velocities is utilized, and when the radar unit is stopped, the computing unit is configured to correct the positions of the plurality of objects detected when the radar unit has been moving, based on the current position of the radar unit stored in the current position storage unit, and to identify the positions of the plurality of objects.

According to this configuration, the radar device can separately detect the plurality of objects according to the difference between their relative velocities. As a result, even when a large number of stationary objects (for example, a ground surface, a pole, a tree, and the like) are disposed around the radar device, clutter from these stationary objects can be separated. Further, the radar device repeats the position measurement of the objects in a state in which the radar unit is moving. Due to this, it is possible to widen a detection range of the objects, compared with a case where the positions of the objects are measured in a state where the radar unit is stopped.

A second aspect is a vehicle provided with the radar device according to the first aspect, wherein the radar unit of the radar device is attached to a side face of the vehicle that is orthogonal to a traveling direction.

This makes it possible to radiate a transmission signal over a wide range from the front side to the rear side in a moving direction of the vehicle, and it is possible to detect a target in the range.

A third aspect is the vehicle according to the second aspect, wherein the radar unit of the radar device is installed in or on a door of the vehicle. As a result, the radar unit moves and a relative velocity is generated between the radar unit and each object due to an opening and closing operation of the door without necessarily being limited to the movement of the vehicle. For this reason, the position of each object can be detected by using a difference between the relative velocities due to the opening and closing operation of the door.

A fourth aspect is the vehicle according to the second aspect, wherein the radar unit of the radar device is installed in or on a door mirror of the vehicle. Accordingly, the radar unit of the radar device can be moved by displacing the door mirror from a housing position to a use position. For this reason, in the state where the vehicle is stopped, the relative velocity can be generated between a stationary target and the radar unit, and the position of the target can be detected.

A fifth aspect is an object position detection method to be applied to a radar device including a radar unit configured to acquire data of a plurality of objects being stationary, a computing unit configured to calculate the acquired data, a current position acquisition unit configured to acquire a current position of the radar unit, and a current position storage unit configured to store the current position of the radar unit, the object position detection method for detecting positions of the plurality of objects, including when the radar unit is moving, calculating, by the computing unit, for each of the plurality of objects, a distance to the object and a relative velocity between the radar unit and the object based on the data acquired by the radar unit, and separately detecting, by the computing unit, the positions of the plurality of objects by using a separation algorithm in which a difference between the relative velocities is utilized, and when the radar unit is stopped, correcting, by the computing unit, the positions of the plurality of objects detected when the radar unit has been moving, based on the current position of the radar unit stored in the current position storage unit, and identifying, by the computing unit, the positions of the plurality of objects.

With this configuration, the plurality of objects can be separately detected according to the difference between the relative velocities. As a result, even when a large number of stationary objects (for example, a ground surface, a pole, a tree, and the like) are disposed around the radar device, clutter from these stationary objects can be separated. In addition, the position measurement of the objects is repeated in a state in which the radar unit is moving. Due to this, it is possible to widen a detection range of the objects, compared with a case where the positions of the objects are measured in a state where the radar unit is stopped.

REFERENCE SIGNS LIST 1, 31 VEHICLE
2 VEHICLE BODY
3 DOOR
4 DOOR MIRROR
11 RADAR DEVICE
12 RADAR UNIT
20 SIGNAL PROCESSING UNIT (COMPUTING UNIT)
21 GPS RECEIVER (CURRENT POSITION ACQUISITION UNIT)
22 STORAGE UNIT (CURRENT POSITION STORAGE UNIT)

The invention claimed is:

1. A radar device comprising:
a radar configured to acquire data of a plurality of stationary objects;
a processor;
a current position acquisition unit configured to acquire a current position of the radar; and
memory configured to store the current position of the radar,
wherein when the radar is moving, the processor is configured to:
acquire, for each of the plurality of objects, a distance to the object, and a relative velocity between the radar and the object based on the acquired data, and
separately detect positions of the plurality of objects based on a difference between the relative velocities, and
wherein when the radar is stopped, the processor is configured to:
correct the positions of the objects detected when the radar was moving, based on the current position of the radar unit stored in the memory, and
identify the positions of the plurality of objects.

2. A vehicle provided with the radar device according to claim 1, wherein the radar of the radar device is attached to a side face of the vehicle, the side face being orthogonal to a traveling direction of the vehicle.

3. The vehicle according to claim 2, wherein the radar of the radar device is installed in or on a door of the vehicle.

4. The vehicle according to claim 2, wherein the radar of the radar device is installed in or on a door mirror of the vehicle.

5. The radar device according to claim 1, wherein the current position acquisition unit is a global positioning system (GPS) receiver.

6. The radar device according to claim 1, wherein the current position acquisition unit is an inertial sensor.

7. The vehicle according to claim 2, wherein the current position acquisition unit acquires a current position of the vehicle as the current position of the radar.

8. An object position detection method for a radar device comprising a radar configured to acquire data of a plurality of stationary objects, the method comprising:
acquiring a current position of the radar and storing the current position of the radar in a memory of the radar device;
when the radar is moving:
calculating, by a processor of the radar device, for each of the plurality of objects, a distance to the object and a relative velocity between the radar and the object based on the data acquired by the radar; and
separately detecting, by the processor, the positions of the plurality of objects based on a difference between the relative velocities, and
when the radar is stopped:
correcting, by the processor, the positions of the plurality of objects detected when the radar unit was moving, based on the current position of the radar stored in the memory of the radar device, and
identifying, by the processor, the positions of the objects.

9. The object position detection method according to claim 8, wherein the radar of the radar device is attached to a side face of a vehicle, the side face being orthogonal to a traveling direction of the vehicle.

10. The object position detection method according to claim 9, wherein the radar of the radar device is installed in or on a door of the vehicle.

11. The object position detection method according to claim 9, wherein the radar of the radar device is installed in or on a door mirror of the vehicle.

12. The object position detection method according to claim 8, wherein the current position of the radar is acquired by a global positioning system (GPS) receiver.

13. The object position detection method according to claim 8, wherein the current position of the radar is acquired by an inertial sensor.

14. The object position detection method according to claim 8, wherein the current position acquisition unit acquires a current position of the vehicle as the current position of the radar.

* * * * *

UNITED STATES PATENT AND TRADEMARK OFFICE
CERTIFICATE OF CORRECTION

| | |
|---|---|
| PATENT NO. | : 11,899,093 B2 |
| APPLICATION NO. | : 17/325716 |
| DATED | : February 13, 2024 |
| INVENTOR(S) | : Katsushisa Kashiwagi et al. |

It is certified that error appears in the above-identified patent and that said Letters Patent is hereby corrected as shown below:

In the Specification

Column 4, Line 15, "unit acquires" should be -- unit 20 acquires --.

Signed and Sealed this
Twenty-fourth Day of December, 2024

Derrick Brent
*Acting Director of the United States Patent and Trademark Office*